United States Patent
Borkenhagen (10) Patent No.: US 8,037,251 B2
(45) Date of Patent: Oct. 11, 2011

(54) MEMORY COMPRESSION IMPLEMENTATION USING NON-VOLATILE MEMORY IN A MULTI-NODE SERVER SYSTEM WITH DIRECTLY ATTACHED PROCESSOR MEMORY

(75) Inventor: John M. Borkenhagen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 630 days.

(21) Appl. No.: 12/172,337

(22) Filed: Jul. 14, 2008

(65) Prior Publication Data

US 2009/0228635 A1 Sep. 10, 2009

Related U.S. Application Data

(63) Continuation-in-part of application No. 12/041,911, filed on Mar. 4, 2008, now Pat. No. 7,966,455.

(51) Int. Cl.
*G06F 12/00* (2006.01)
(52) U.S. Cl. ............... 711/128; 711/161; 711/170
(58) Field of Classification Search .............. 711/128, 711/161, 170
See application file for complete search history.

(56) References Cited

U.S. PATENT DOCUMENTS

| | | | |
|---|---|---|---|
| 5,255,382 A * | 10/1993 | Pawloski | ............... 711/2 |
| 5,812,817 A | 9/1998 | Hovis et al. | |
| 6,658,549 B2 | 12/2003 | Wilson et al. | |
| 6,681,305 B1 | 1/2004 | Franke et al. | |
| 6,766,429 B1 | 7/2004 | Bland et al. | |
| 6,775,751 B2 | 8/2004 | Tremaine | |
| 6,944,740 B2 | 9/2005 | Abali et al. | |
| 6,956,507 B2 | 10/2005 | Castelli et al. | |
| 6,961,821 B2 | 11/2005 | Robinson | |
| 6,968,424 B1 | 11/2005 | Danilak | |
| 7,302,543 B2 | 11/2007 | Lekatsas et al. | |
| 7,636,810 B2 | 12/2009 | Ramakrishnan | |
| 2004/0264256 A1 * | 12/2004 | Mauritz et al. | ........... 365/189.01 |

* cited by examiner

*Primary Examiner* — Stephen Elmore
(74) *Attorney, Agent, or Firm* — Toler Law Group (57) ABSTRACT

A method, an apparatus and a program product may enable scalable bandwidth and memory for a system having processor with directly attached memory. Multiple memory expander microchips may include non-volatile memory to provide additional memory bandwidth and capacity while in communication with the processor. The uncompressed data region may be implemented with standard high speed dynamic random access memory. The less frequently accessed compressed data region may be implemented with non-volatile memory to leverage its benefits of higher density, more capacity, and lower power compared to DRAM. Memory and bandwidth allocation between may be dynamically adjusted.

20 Claims, 4 Drawing Sheets

MEMORY COMPRESSION IMPLEMENTATION USING NON-VOLATILE MEMORY IN A MULTI-NODE SERVER SYSTEM WITH DIRECTLY ATTACHED PROCESSOR MEMORY

RELATED APPLICATIONS

The present application is a continuation in part of application Ser. No. 12/041,911, entitled "Memory Compression Implementation in a Multi-Node Server System with Directly Attached Processor Memory", filed on Mar. 4, 2008 now U.S. Pat. No. 7,966,455, which relates to co-pending U.S. patent application Ser. No. 12/041,863 and U.S. Pat. No. 7,930,483, respectively entitled "Memory Compression Implementation in a System with Directly Attached Processor Memory" and "Associativity Implementation in a System with Directly Attached Processor Memory", both by the same inventor, John M. Borkenhagen, and which are incorporated by reference in their entireties.

FIELD OF THE INVENTION

The present invention generally relates to computer memory architecture, and in particular, to architectures for managing bandwidth and memory compression.

BACKGROUND OF THE INVENTION

Increased processor and bandwidth demands continue to drive advances in central processing units (CPUs) and associated memory devices. A CPU typically includes a die, or microchips, which contain multiple processing units, communications hardware, and a local networking or communications bus. The core logic chipsets, or cores, are the components that make up the processor die. The cores comprise the central processing logic of a computing system. A system's core logic typically includes a controller for handling memory functions, a cache for storing instructions, the logic for bus interfaces, and the functions of data paths. A single die can contain hundreds of processor cores. In increasing the number of cores, computer performance also increases, as does the need for more memory. For efficiency considerations, the memory-to-processor core ratio must stay relatively constant. That is, as more processors are added, memory must be proportionally added.

The need for higher memory to processor-core ratios is further driven by advances in virtualization. Virtualization makes it possible to run multiple operating systems and multiple applications on the same computer at the same time, increasing the utilization and flexibility of hardware. In one respect, virtualization allows the transformation of hardware into software, including the CPU, RAM, hard disk and network controller, to create a fully functional virtual machine that can run its own operating system and applications just like a physical computer. Virtualization is advantageous because it allows for server consolidation and increased processor accessibility. And thus, virtualization is driving the need for even higher memory to processor-core ratios, and higher memory capacity on servers.

The increased processing afforded by virtualization requires the addition of memory to maintain the required ratio. For speed considerations, the preferred way to add memory is to attach main memory directly to the processor. Performance is increased with data being stored directly in main memory, as opposed to slower, remote memory, e.g., memory on a disk. However, attaching memory directly to the processor typically imposes a limitation on the total amount of available bandwidth and memory. Attached memory may be inadequate for applications requiring larger bandwidth and/or memory capacities. Bandwidth is the amount of data that can be carried from one point to another in a given time period.

Memory compression is sometimes used to optimize available memory. Using compression, data may be encoded (represented as symbols) to take up less space. Memory compression effectively expands memory capacity up to two or more times for some applications without increasing actual physical memory and associated expenses. Despite its benefits, however, memory compression typically requires more memory bandwidth than is available in conventional attached memory, as well as compression logic.

Memory compression is often measured in terms of its associated compression ratio. The compression ratio is the quotient of memory space required by uncompressed data relative to the smaller amount of memory space required by compressed data. As data changes in main memory, the compression ratio can also change. When the compression ratio decreases, more physical memory is required. As a result, some needed physical memory must be vacated to accommodate changing data having a small compression ratio. This practice requires interaction with the operating system, taxing overall system processes. It can prove difficult to obtain the needed support from the operating systems to efficiently accomplish memory compression.

Caching is another common technique used to speed memory processes. A cache memory is smaller, faster and typically more expensive than main memory. When a CPU requests data that resides in main memory, the processing system transmits the requested data to the processor, and also may store the data in a cache memory. When the processor issues a subsequent request for the same data, the processing system first checks cache memory. If requested data resides in the cache, the system gets a cache "hit" and delivers the data to the processor from the cache. If the data is not resident in the cache, a cache "miss" occurs, and the system retrieves the data from main memory. Frequently utilized data thus is retrieved more rapidly than less frequently requested data, and overall data access latency, i.e. time between a request for data and delivery of the data, is reduced.

In the context of memory compression, caching becomes more complex and requires additional bandwidth. Memory compression may require additional bandwidth to support the overhead of accessing an optional cache mapped into main memory that holds uncompressed data, and for accommodating a cache miss. Additional bandwidth may also be needed for fetching information from a compressed data table entry that points to where compressed data is stored, as well as for accessing the actual data that is to be uncompressed. Likewise, on a write, a large amount of bandwidth may be needed to store data into the cache or to main memory.

In associative mapping, instead of hard-allocating cache lines to particular memory locations, it is possible to design the cache so that any line can store the contents of any memory location. A cache line is the smallest unit of memory than can be transferred between the main memory and the cache. Associativity improves performance by, in part, enabling multiple concurrent accesses to portions of memory.

Relatively large amounts of bandwidth are needed to support associativity, however. On some processor memory architectures, for instance, the x86, there is not enough memory bandwidth to support a cache operations, memory compression and associativity. Moreover, server consolidation, transaction databases, and engineering design automation efforts require relatively large memory capacities and bandwidth than can be conventionally supported by systems having processors with directly attached memory. The inability to support these and other memory optimizing processes relegates manufacturers to using other, less efficient forms of memory access and lower performance.

Consequently, what is needed is an improved manner of managing memory in a system comprising a processor with directly attached memory.

SUMMARY OF THE INVENTION

The present invention provides an improved computer implemented method, program product and apparatus for managing memory, comprising a memory, a processor directly attached to the memory; and a plurality of memory expander nodes, wherein at least one of the memory expander nodes is in communication with the processor. Each memory expander node may include non-volatile memory, memory expander logic configured to access the non-volatile memory, and a memory channel connecting the memory expander logic and the non-volatile memory.

According to one aspect of the invention, the non-volatile memory may include compressed data. The memory attached to the processor may include dynamic random access memory storing uncompressed data. Embodiments of the non-volatile memory may include phase change memory or flash memory, among others.

The memory expander logic may be configured to implement operations involving memory compression. The memory expander logic may further be configured to implement operations involving multi-way associativity.

In an embodiment that is consistent with the invention, the memory expander node in communication with the processor may include a cache. One such cache may be associated with uncompressed data. The memory expander node may be configured to communicate with another memory expander node, and not the processor. Such a memory expander node may include compressed data for latency considerations.

According to another aspect of the invention, the non-volatile memory may include at least one of compressed and uncompressed data, as may the memory expander logic. The memory expander logic may additionally include a compression/decompression engine, and/or a portion of the memory channel. The memory expander logic is configured to implement memory read and write commands initiated by the processor, and may comprise a microchip.

According to another embodiment that is consistent with the invention, a nodal circuit may be in communication with another nodal circuit of a computer system that includes a processor having directly attached memory and being in communication with at least one of the nodal circuits. The nodal circuit may comprise a node memory, memory expander logic configured to access the non-volatile memory, and a memory channel connecting the memory expander logic and the non-volatile memory. The memory expander logic may implement memory compression. Alternatively or additionally, the memory expander logic may implement multi-way associativity.

Another aspect of the invention includes a method of managing compressed memory data, comprising attaching a first memory directly to a processor, attaching a memory expander node to the processor, attaching another memory expander node to the processor and/or the memory expander node, and implementing a memory access operation using the memory expander logic. Each memory expander node may comprise non-volatile memory, memory expander logic configured to access the non-volatile memory, and a memory channel connecting the memory expander logic and the non-volatile memory.

Embodiments may store compressed data within the non-volatile memory. Uncompressed data may be stored within dynamic access memory of the first memory. The memory implementation may include a memory compression or a multi-way associativity operation. The operation may be implemented on a cache comprising part of the non-volatile memory and/or the memory expander logic. Frequently used data may be stored in the memory expander node attached to the processor. The non-volatile memory may include compressed and/or uncompressed data. The processor may initiate implementation of the memory compression or associativity operation. The amount of the uncompressed and/or compressed data may be dynamically altered in the other memory expansion node.

In another aspect of the invention, a program product comprises program code configured to implement a memory operation, wherein the program code resides on a memory expander node configured to communicate with both a processor having directly attached memory and another memory expander node, and a computer readable medium bearing the program code.

These and other advantages and features that characterize the invention are set forth in the claims annexed hereto and forming a further part hereof. However, for a better understanding of the invention, and of the advantages and objectives attained through its use, reference should be made to the Drawings and to the accompanying descriptive matter in that there are described exemplary embodiments of the invention.

DETAILED DESCRIPTION

Embodiments consistent with the underlying principles of the present invention may include multiple memory expander microchips having non-volatile memory As such, aspects of the invention enable scalable bandwidth and memory for a system having processor with directly attached memory. Multiple memory expander microchips may include the non-volatile memory to provide additional memory bandwidth and capacity while in communication with the processor. The uncompressed data region may be implemented with standard high speed dynamic random access memory (DRAM). The less frequently accessed compressed data region may be implemented with non-volatile memory to leverage its benefits of higher density, more capacity, and lower power compared to DRAM. Memory and bandwidth allocation between may be dynamically adjusted.

Non-volatile memory is computer memory that retains stored information even when not powered. As discussed herein, specific examples of non-volatile memory include phase change memory and NOR flash memory. Generally, non-volatile memory comprises read-only memory, flash memory, most types of magnetic computer storage devices (e.g. hard disks, floppy disk drives, and magnetic tape), optical disc drives, and early computer storage methods such as paper tape and punch cards. Flash memory is non-volatile computer memory that can be electrically erased and reprogrammed.

In contrast, DRAM is a type of random access memory that stores each bit of data in a separate capacitor within an integrated circuit. Since real capacitors leak charge, the information eventually fades unless the capacitor charge is refreshed periodically. Because of this refresh requirement, it is a dynamic memory as opposed to static random access memory.

The memory expander microchip may comprise memory control logic, typically on a silicon microchip, which implements memory compression and/or associativity in a manner that does not burden the attached processor or associated operating system. In one embodiment, the processor may store uncompressed data in its lower latency, directly attached memory, while the memory attached to the nearest memory expander may store either or both compressed and uncompressed data.

The memory expander microchips may each comprise a silicon microchip that provides additional capacity to implement memory read and write commands generated by and communicated from a processor. As such, the memory expander microchips may not execute program instructions like a processor, but rather, may facilitate memory read and write commands generated to enable increased capacity. In some embodiments, the memory expander microchip may include I/O capability.

A memory expander microchip may include its own memory control logic, and may be attached directly to non-volatile memory. NOR flash and phase change memory are types of non-volatile computer memory. NOR flash is currently used in cell phones and has low read latency compared to NAND flash. Phase change memory typically uses the unique behavior of chalcogenide glass, which may be switched with the application of heat between two states, crystalline and amorphous. Phase change memory may achieve two additional distinct states, effectively doubling its storage capacity. Non-volatile memory, such as NOR flash and phase change memory may offer much higher performance in embodiments compared to NAND flash. The memory element may be read more quickly. Phase change memory may have an advantage over NOR flash in some embodiments because the phase change memory element may be written more quickly than NOR flash. The phase change memory may further support more write/erase cycles than does NOR flash.

The relatively high speed of NOR flash and phase change memories are thousands of times quicker than conventional hard drives. This speed makes them particularly useful in nonvolatile memory roles consistent with embodiments of the present invention. A memory compression embodiment of the present invention has a region of frequently accessed uncompressed data that requires low access latency and a region of less frequently accessed compressed data that can tolerate higher access latency. Embodiments consistent with the present invention implement the uncompressed data region with standard high speed DRAM. Because the embodiment tolerates higher latency in the less frequently accessed compressed data region, it is implemented with non-volatile memory to leverage its benefits of higher density, more capacity, and lower power compared to DRAM.

Embodiments consistent with the invention provide a memory compression architecture using a chipset with both multi-node scaling and memory expansion. Aspects of the invention thus provide improved computer server performance, especially for applications that benefit greatly from large memory capacity and bandwidth. Server consolidation, transaction databases, and engineering design automation are examples of applications that benefit greatly from large memory capacity.

The memory expansion chips and associated non-volatile memory may provide additional memory capacity to processor systems that already have memory directly attached to the processors. The additional memory helps keep the ratio of memory to the number of cores balanced. This feature is particularly advantageous in view of applications where processor cores are increasing. For instance, scalability may satisfy the larger memory capacity demands of server consolidation and virtualized servers, as well as those applications that receive a significant performance gain when fitting an entire database or design into main memory.

The memory expansion chips respectively include multiple memory channels to support a large capacity of memory. The memory channels provide more memory bandwidth than the processor and I/O can consume. The additional memory bandwidth is available to support multi-way associativity for a memory compression cache. This may further result in improved performance for memory compression. The memory expansion chip technology and memory compression may be mutually beneficial. That is, the memory expansion chip provides the additional bandwidth required for memory compression and an associative compression cache, while memory compression enhances the performance of large memory systems.

Memory expansion microchips may also support other functions in the system. Embodiments may include coherency to allow coherent multi-node scaling. Added memory expansion nodes may include a copy of the chipset logic. The additional nodes need not be populated with processors. In one embodiment, a local node comprising a memory expansion microchip and a connected memory may be in direct communication with the processor. Other nodes in communication with the local node may not be directly attached to the processor. As such, the local node may attach to one or more processors, while the additional nodes attach to no processors. The additional nodes may support additional non-volatile memory off the memory channels of the memory expander microchips. The resulting system may have a very high memory/processor core ratio that is beneficial to performance of some applications.

Access to off-node memory may be longer latency than on-node memory, i.e., nodes directly attached to a processor. Off-node access may have to traverse the on-node memory expander microchip, cross the scalability link, go through the off-node memory expander microchip to the off-node non-volatile memory. Communications may then come back through the off-node memory expander microchip, the scalability link, and the on-node memory expander microchip.

A compression cache that holds uncompressed data preferably has low latency. Higher memory access latency may be tolerated (and have less of a relative impact) when missing the compression cache, accessing the compressed data directory and/or the compressed data, and decompressing the data. Embodiments consistent with the invention may implement the compression cache on the local node and hold the compression table and compressed data on the remote nodes. A variation of this embodiment may hold both the compression cache and the compression table on the local node, and the compressed data on the remote nodes.

In a conventional processor system without memory expander microchips, there is limited memory bandwidth to the memory directly attached to a processor. The limited bandwidth inhibits memory compression. Memory compression is sometimes used to optimize available memory. Using compression, data may be encoded (represented as symbols) to take up less space. Memory compression effectively expands memory capacity up to two or more times for some applications without increasing actual physical memory and associated expenses.

Memory compression is often measured in terms of its associated compression ratio. The compression ratio is the quotient of memory space required by uncompressed data relative to the smaller amount of memory space required by compressed data. As data changes in main memory, the compression ratio may also change. When the compression ratio decreases, more physical memory is required. As a result, some physical memory must be vacated to accommodate changing data having a small compression ratio.

Memory compression requires memory bandwidth for compression cache accesses, translation table/directory and compression cache lookups. In the event of a cache miss, bandwidth is required for uncompressed data accesses. This bandwidth requirement may be larger than what is required for a traditional, uncompressed access to the main store, or directly attached memory. A miss in the compression cache (caching data associated with compressed data) typically results in the accessed data being from an unintended address. If every memory access misses the compression cache, memory bandwidth requirements may triple compared to a system without memory compression. Such a scenario may result in three access operations: one access to the compression cache, one access to the compressed data directory (address translation table for compressed data held in the main store), and then a third access to the compressed data.

The directory information for the compression cache may be held with the data in the main memory that holds the compression cache, in a directory contained in the memory controller chip, or in the compressed data directory. Directory information may reside in the main memory with the compressed data directory. Alternatively, the directory information may reside in the compression cache data to allow flexibility in compression cache size and to keep the memory controller chip area manageable.

When directory information is held in the main memory, a memory write may require a read of the directory information, followed by a write. The memory bandwidth limitations on a directly attached processor are limited to a degree that they inhibit the use of memory compression without the addition of a memory expander microchip. When the compressed data directory holds the compression directory information, it may be accessed in parallel with the compression cache. Even if the compressed data directory does not hold the compression directory information, the compressed data directory needs to be accessed to locate the desired compressed memory location.

The memory expander microchips provide additional system main memory. Each memory expander microchip has multiple memory channels to support connection to multiple non-volatile memories for additional memory capacity. For example, a typical memory expander microchip may include eight memory channels. This inclusion effectively adds eight memory channels worth of bandwidth in addition to the standard bandwidth from the memory directly attached to the processor.

The eight memory channels provided by each microchip (where so configured) provide more than enough bandwidth to support accesses to a compression cache and the compressed data directory (addresses to the compressed data). The bandwidth may also accommodate accesses to compression directory information, e.g., a compressed data table, in instances when there are misses to the compression cache.

In this capacity, memory channels may function to deliver data from one point to another. The memory channel may comprise one or more of the following components: format conversion devices, encoders (compressors) and decoders (decompressors), buffers, stream segmentation and reassembly devices, multiplexors and demultiplexors, modulators and demodulators, transmission facilities, switches, multipoint conference units, and other components necessary to achieve the desired channel characteristics. For purposes of this specification, memory channels may include memory. A sequence of data bits submitted to the channel input results in a similar (not necessarily identical) sequence of bits at the channel output.

Some of the memory channels on the memory expansion chips may be allocated to compressed data and others may be allocated for the compression cache. Memory attached directly to the processor may be standard uncompressed data regions (neither compressed data or a compression cache). Each memory channel dedicated to the compression cache may be a way, or class, for the associative compression cache. All classes from the associative compression cache may be accessed in parallel. The logic on the memory expander microchip(s) may determine if there is a hit to any of the classes. The hit information may come from the compression cache or the compressed data directory. If any of the compression cache classes has a hit, that data may be forwarded to the processor as with a conventional data store to main memory.

Where desired, the memory expansion chips' compression control logic may dynamically allocate a different ratio of channels between compressed data and the compression cache based on the compression cache hit ratio. The compression cache associativity may be dynamically increased and decreased to determine the optimal associativity ratio to compressed data. As compressed data memory is reduced, the operating system or hypervisor may reduce the number of available memory pages in main store, e.g., directly attached memory. As compressed data memory is increased, the operating system or hypervisor may increase the number of available memory pages in main store.

The memory expander microchips of another or the same embodiment may include some attached memory comprising standard, uncompressed memory data, e.g., not data cache or compressed data. In addition to static allocation, the hypervisor or operating system may monitor compression ratios and make more memory on a memory expansion microchip (s) be standard memory. This may occur if the compression ratio is low. If the compression ratio is high, more memory on the memory expansion microchip(s) may be compressed data.

According to one aspect of invention, a hypervisor or an operating system may address map the most frequently used memory to an uncompressed main store that is directly attached to the processor. Longer latency memory on the memory expander microchip(s) may be used for memory compression. Less frequently used memory may be mapped into a memory range of the memory expander microchip(s) that holds the compressed data.

As such, embodiments consistent with the underlying principles of the present invention may allow a single entity to manage memory comprising both compressed and uncompressed data.

The memory expander microchips may selectively include an uncompressed data cache. The uncompressed data cache may exist on the memory expander microchip or may be mapped into the memory on the non-volatile memory attached to the memory expander microchip. In this manner, memory compression may be hidden from the processor.

In addition to supporting the possibility for an uncompressed data cache mapped to the non-volatile memory, the memory expander microchip may provide the option of having a range of normal uncompressed memory in the non-volatile memory attached to it, with or without the uncompressed data cache.

The memory compression feature may be optionally disabled for applications that do not benefit from memory compression. In this case, the memory attached to the memory expander microchip may act as uncompressed memory.

Figure 1:
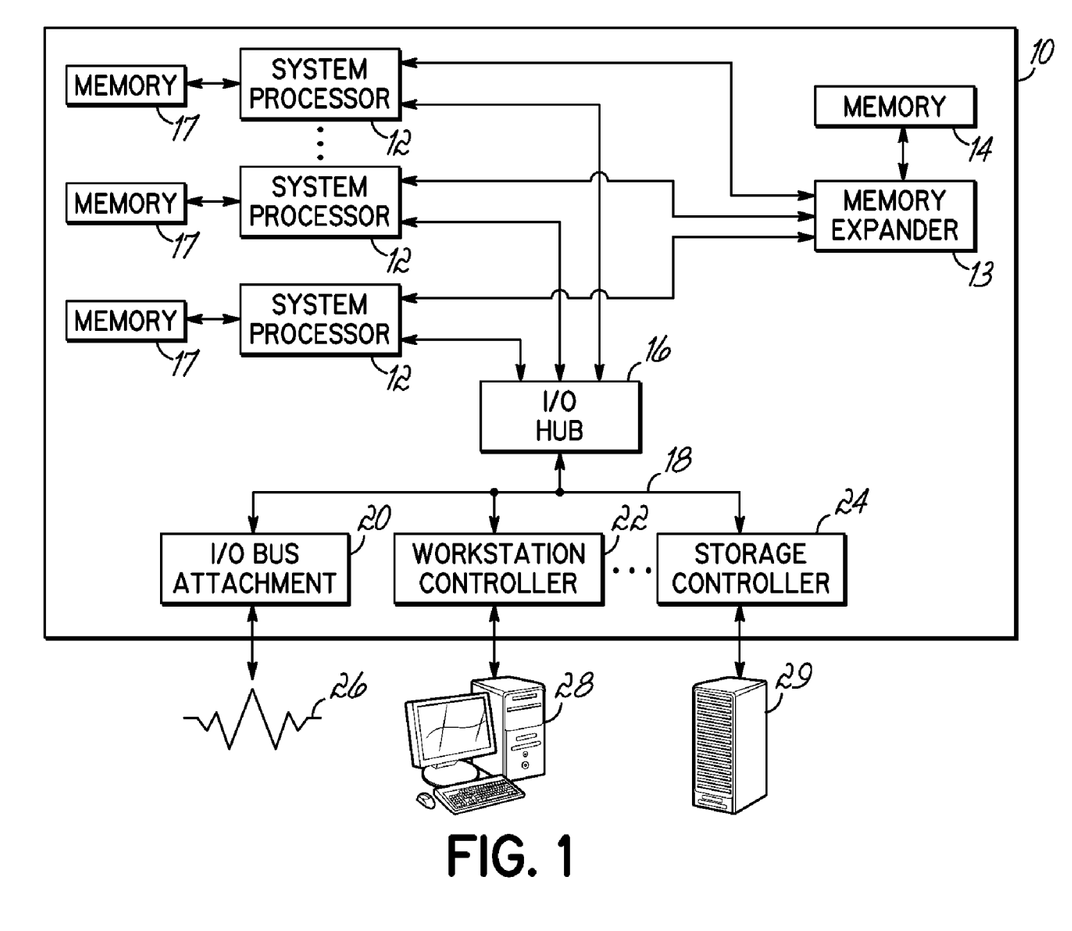
FIG. 1 is a block diagram of a computer system configured to manage memory compression using a memory expander microchip attached to a processor having directly attached memory in accordance with the principles of the present invention.

Turning more particularly to the drawings, FIG. 1 illustrates a data processing apparatus 10 consistent with the invention. Apparatus 10 generically represents, for example, any of a number of multi-user computer systems such as a network server, a midrange computer, a mainframe computer, etc. However, it should be appreciated that the invention may be implemented in another data processing apparatus, e.g., in stand-alone or single-user computer systems such as workstations, desktop computers, portable computers, and the like, or in other computing devices such as embedded controllers, and the like. One suitable implementation of apparatus 10 may be a multi-user computer, such as the Series i computer available from International Business Machines Corporation (IBM).

Apparatus 10 generally includes one or more physical processors 12 coupled to an input/output (I/O) hub 16. Each processor may directly and respectively attach to memory 17, e.g., an array of non-volatile memory. Where desired, the physical processors 12 and/or environment may be multithreaded. Multithreading enables different portions of program code to execute concurrently. Also illustrated as in communication with processors 12 is a memory expander microchip 13. The memory expander microchip 13 may be in communication with additional memory 14, e.g. non-volatile memory. As discussed herein, the memory expander microchip 13 may connect to other memory expander microchips and associated memory 14 (collectively referred to as nodes).

Furthermore, I/O hub 16 may couple to a number of types of external I/O devices via a system bus 18 and a plurality of interface devices. Exemplary I/O devices include a bus attachment interface 20, a workstation controller 22 and a storage controller 24. Such I/O devices may respectively provide external access to one or more external networks 26, one or more workstations 28, and/or one or more storage devices such as a direct access storage device (DASD) 29.

Figure 2:
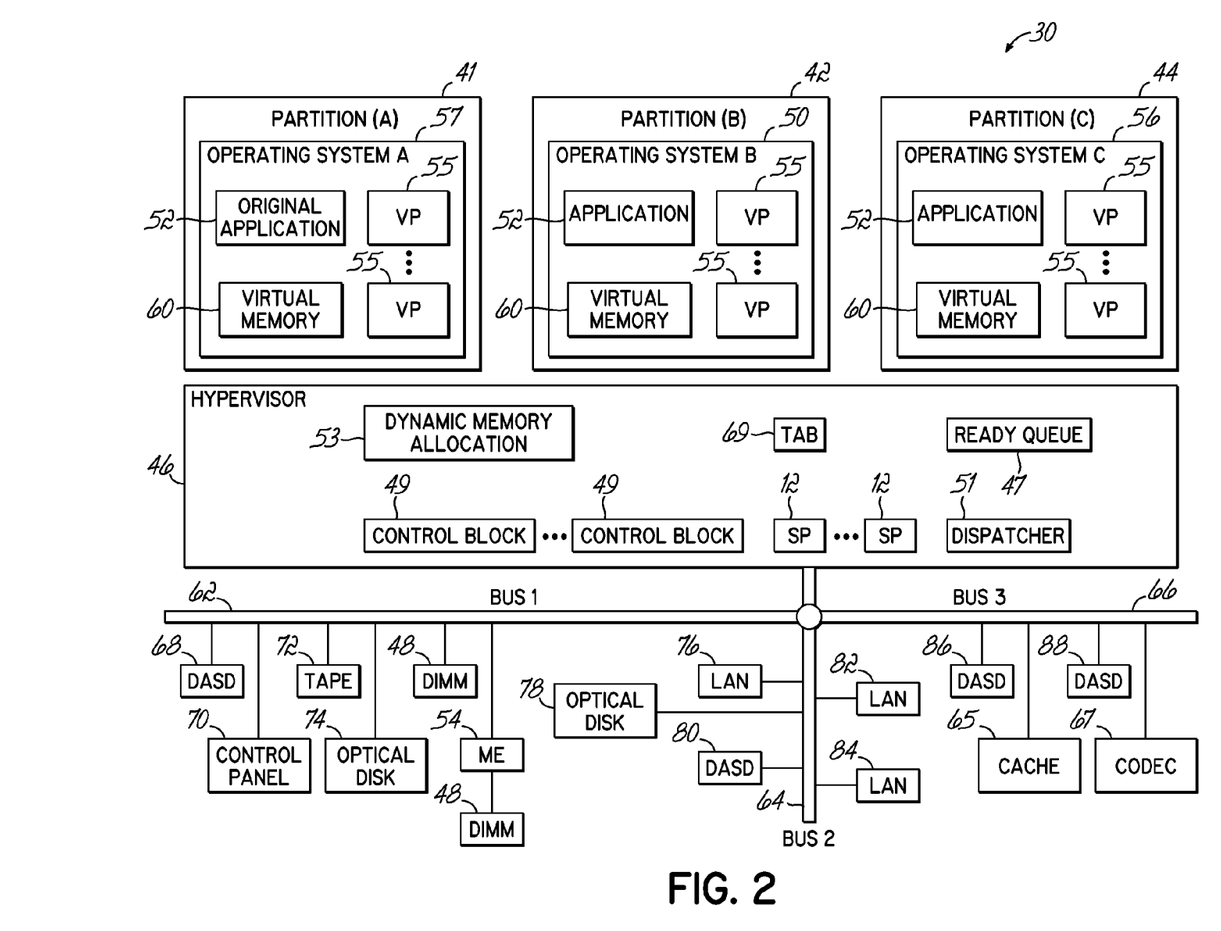
FIG. 2 is a block diagram of primary software components and resources consistent with the computer system of FIG. 1.

FIG. 2 illustrates in greater detail the primary software components and resources used to implement a logically partitioned environment consistent with apparatus 10 of FIG. 1. FIG. 2 generally shows a computing architecture characterized as a virtual machine design developed by IBM. The system 30 includes a plurality of partitions 41, 42, 44 that share common processing resources among multiple processes. Such an architecture may rely upon a single computing machine having one or more physical processors/CPUs 12. The CPUs 12 may execute software configured to simulate multiple virtual processors 55.

The partitions 41, 42, 44 may logically comprise a portion of a system's physical CPUs 12, DASD 68, and other resources as assigned by an administrator. Each partition 41, 42, 44 typically hosts an operating system 50, 56, 57 and may have multiple virtual processors 55. In this manner, each partition 41, 42, 44 operates largely as if it is a separate computer. As shown in FIG. 2, the production environment comprising each partition 41, 42, 44 may also include program code, such as the applications 52 shown in FIG. 2.

An underlying program called a hypervisor 46, or partition manager, may use this scheme to assign physical resources to each partition 41, 42, 44. In virtualization technology, the hypervisor 46 may manage the operating systems 50, 56, 57 (or multiple instances of the same operating system) on a single computer system. The hypervisor 46 may manage the system's processor, memory, and other resources to allocate what each operating system 50, 56, 57 requires. For instance, the hypervisor 46 may intercept requests for resources from operating systems 50, 56, 57 to globally share and allocate resources. If the partitions 41, 42 and 44 are sharing processors, the hypervisor 46 may allocate physical processor cycles between the virtual processors 55 of the partitions 41, 42, 44 sharing the CPU 12.

In the context of memory compression, the hypervisor 46 may accomplish additionally required data retrieval management. Significantly, such data retrieval may be accomplished in at least one embodiment without exploiting the CPU processing cycles of the operating systems 50, 56, 57. Where desired, the hypervisor 46 may include a dynamic memory allocation program 53 configured to dynamically allocate memory. The program 53 may dynamically allocate a different ratio of memory channels based on the compression cache hit ratio, for instance. As compressed data memory is reduced, the hypervisor 46 may reduce the number of available memory pages in the main store 17. As compressed data memory is increased, the hypervisor 46 may increase the number of available memory pages in main store 17.

Each operating system 50, 56, 57 controls the primary operations of its respective logical partition 41, 42, 44 in the same manner as the operating system of a non-partitioned computer. Each logical partition 41, 42, 44 may execute in a separate memory space, represented by virtual memory 60. Moreover, each logical partition 41, 42, 44 is statically and/or dynamically allocated a portion of the available resources in system 30. For example, and as discussed herein, each logical partition may share one or more physical CPUs 12, as well as a portion of the available memory space for use in virtual memory 60. In this manner, a given physical CPU 12 may be utilized by more than one logical partition 41, 42, 44.

The hypervisor 46 may include a dispatcher 51 that manages the dispatching of virtual processors to physical processors on a dispatch list or ready queue 47. The ready queue 47 comprises memory that includes a list of virtual processors having work that is waiting to be dispatched on a physical processor 12. The hypervisor 46 shown in FIG. 2 also controls physical CPUs 12, and may additionally control memory expanders 54 and non-volatile memory 14, 48. Processor control blocks 49 of the hypervisor 46 comprise memory that includes a list of virtual processors waiting for access on a particular physical processor 12.

Additional resources, e.g., mass storage, backup storage, user input, network connections, and the like, are typically allocated to one or more logical partitions in a manner well known in the art. Resources may be allocated in a number of manners, e.g., on a bus-by-bus basis, or on a resource-byresource basis, with multiple logical partitions sharing resources on the same bus. Some resources may even be allocated to multiple logical partitions at a time. FIG. 2 illustrates, for example, three logical buses 62, 64 and 66, with a plurality of resources on bus 62, including a direct access storage device (DASD) 68, a control panel 70, a tape drive 72 and an optical disk drive 74, allocated to a partition.

Bus 64, on the other hand, may have resources allocated on a resource-by-resource basis, e.g., with local area network (LAN) adaptor 76, optical disk drive 78 and DASD 80 allocated to logical partition 42, and LAN adaptors 82 and 84 allocated to logical partition 44. Bus 66 may represent, for example, a bus allocated specifically to logical partition 44, such that all resources on the bus, e.g., DASD's 86 and 88, are allocated to the same logical partition.

The hardware shown in FIG. 2 optionally comprises one or more caches 65, a compression/decompression engine (CODEC) 67, memory expanders (ME) 54 and compressed storage in the non-volatile memory 14, 48. Within the compressed storage in the non-volatile memory 14, 48 and/or other memory, the system 30 may include compressed and uncompressed memory. It will be understood by one skilled in the art that the distinction between compressed and uncompressed memory may be a logical one in that both may exist in the same physical storage, for example, the same memory array. Uncompressed memory may comprise memory containing uncompressed data. In a similar fashion, compressed memory may be defined as memory containing compressed data. The data in virtual memory may reside in memory. Main store 17 may include either or both uncompressed and compressed data. One skilled in the art will appreciate that other embodiments consistent with the invention may be realized by executing the above programs in an operating system 50, 56, 57 in addition or as opposed to in the hypervisor 46.

It will be appreciated that the illustration of specific resources in FIG. 2 is merely exemplary in nature, and that any combination and arrangement of resources may be allocated to any logical partition in the alternative. For instance, it will be appreciated by one of skill in the art that in some implementations resources can be reallocated on a dynamic basis to service the needs of other logical partitions. Furthermore, it will be appreciated that resources may also be represented in terms of the I/O processors used to interface the computer with the specific hardware devices.

The various software components and resources illustrated in FIG. 2 may be implemented in a number of manners, including using various computer software applications, routines, components, programs, objects, modules, data structures, etc., referred to hereinafter as computer programs, tools, programs or program code. Program code typically comprises one or more instructions that are resident at various times in various memory and storage devices in the computer, and that, when read and executed by one or more processors in the computer, cause that computer to perform the steps necessary to execute steps or elements embodying the various aspects of the invention.

Moreover, while the invention has and hereinafter will be described in the context of fully functioning computers, those skilled in the art will appreciate that the various embodiments of the invention are capable of being distributed as a program product in a variety of forms, and that the invention applies equally regardless of the particular type of computer readable medium used to actually carry out the distribution. Examples of computer readable media include, but are not limited to tangible, recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environments illustrated in FIGS. 1 and 2 are not intended to limit the present invention. Though not shown in FIG. 2, for instance, one skilled in the art will appreciate that other partitions may be included within other embodiments, including a partition that comprises part of the hypervisor 46. This hypervisor partition functions in many ways like the conventional partitions 41, 42 and 44 (and operating systems), but has no user interface for the customer to protect it from failures that might otherwise come about through user interaction. Furthermore, while three logical partitions 41, 42 and 44 are shown in FIG. 2, one skilled in the art will appreciate that more or fewer partitions may be implemented as needed. Other alternative hardware and/or software environments may thus be used without departing from the scope of the invention.

Figure 3:
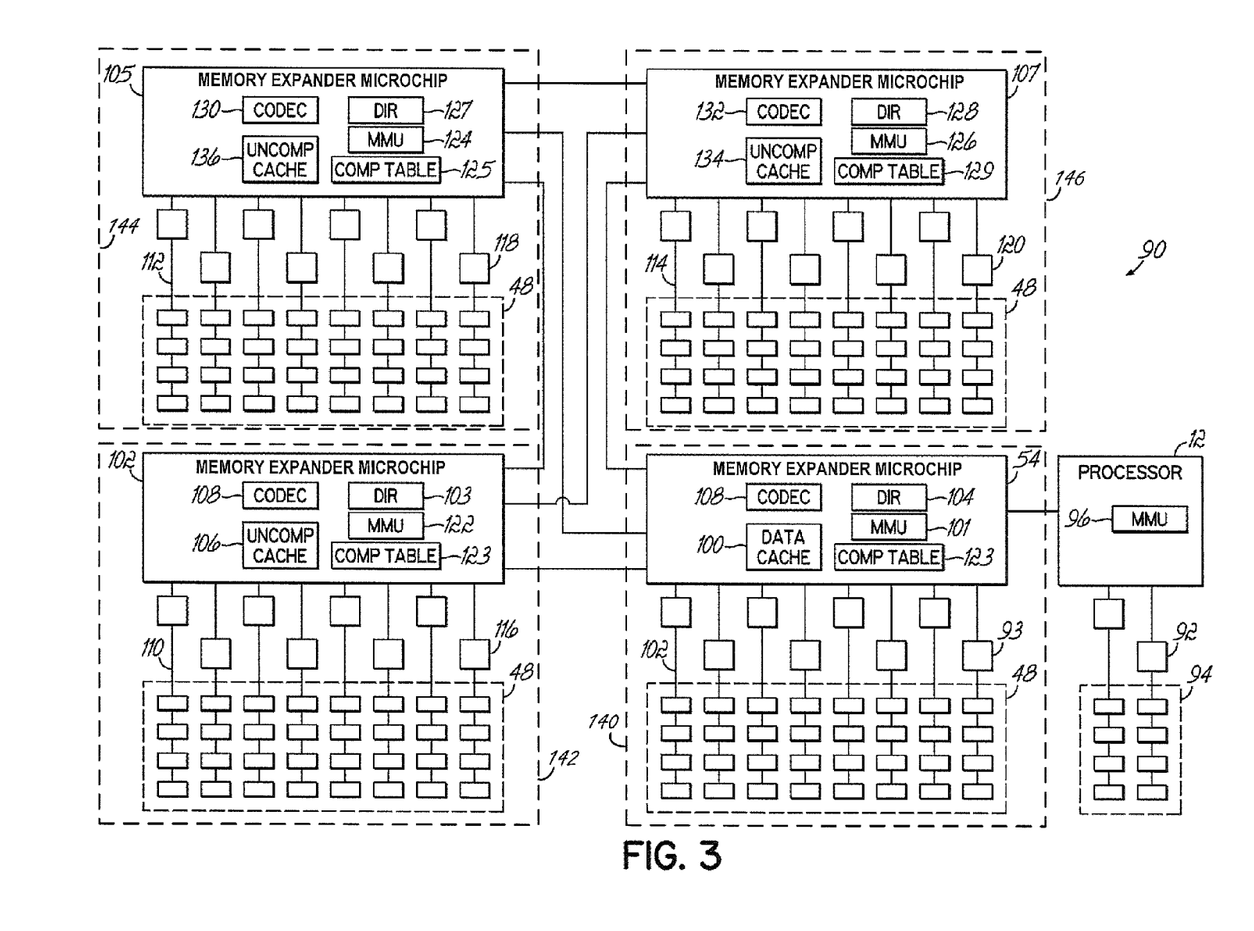
FIG. 3 shows a system having a processor having both a directly attached memory and directly attached memory expander in accordance with aspects of the present invention.

FIG. 3 shows a system 90 having a physical CPU 12 having directly attached memory/non-volatile memory 94 and in communication with a directly attached memory expander 54. The memory expander 54 is in communication with memory expander microchips 102, 105, 107.

More particularly, the system 90 includes a physical processor 12 directly attached to memory 94 and having compressed and/or uncompressed storage in the non-volatile memory 48 attached to the memory expander 54. As shown in FIG. 3, the physical processor 12 also attaches to the memory expander 54. The physical processor 12 connects directly to the memory 94 via memory buffer microchips 92. As shown in FIG. 3, the physical processor 12 may include a memory management unit (MMU) 96. The memory 94 is directly attached in that it may be proximate to and/or in uninterrupted communication with the processor, as opposed to remote memory, e.g., on a disk.

The memory expander microchip 54 may include a MMU 101, a compressed cache directory 103, a compressed data table 125 and an (uncompressed) data cache 100. The data cache 100 may include uncompressed and cached data associated with either uncompressed or compressed data stored in memory 48. The MMU 101 may programmatically implement compression/decompression and other memory functions. For this purpose, the memory expander microchip 54 may also include a CODEC 108. As discussed herein, embodiments consistent with the invention allow the MMU 101 to implement and otherwise manage such memory functions without burdening the CPU 12 or hypervisor 46.

In order to improve performance, the uncompressed cache directory 98 typically has a fast access time. Within the general scheme of processor memory accesses, most memory accesses fall within a small range of the total available memory storage. A memory architecture, according to embodiments of the present invention, may be used with a most recently used control scheme to maintain the most active segments of memory within the uncompressed data cache 100. The uncompressed cache directory 98 for uncompressed storage preferably must have a short access time in comparison to the overall access time of the uncompressed data cache 100 in order to minimally impact typical accesses to memory.

The function of the uncompressed cache directory 98 is to determine if the memory access is in uncompressed data cache 100 or not, and if it is in uncompressed data cache 100, to provide the address in physical memory where the data resides.

A function of the compressed data table 125 is to provide a directory for the memory locations that are in the compressed storage in the non-volatile memory 48. When an access to the memory misses the data cache 106, it generates an access to the compressed data table 125. The data from this access contains the location of the data within compressed storage in the non-volatile memory 48. The address results in an access to the compressed storage in the non-volatile memory 48, which in turn may result in compressed data being accessed and processed by the CODEC 108. The CODEC 108 may perform compression and decompression on the data. The resultant uncompressed data may be placed in the uncompressed data cache 100 and transferred to the requesting element (for a fetch), or updated and maintained within the uncompressed data cache 100 for a store.

As shown in FIG. 3, the memory expander microchip 54 connects to or otherwise communicates with other memory expander microchips 102, 105, 107. Each memory expander microchip 102, 105, 107 may provide the system 90 with additional bandwidth by virtue of memory channels 110, 112, 114.

Similar to memory expander microchip 54, memory expander microchips 102, 105, 107 may connect to respective non-volatile memory 48 to form respective nodes. The memory expander microchips 102, 105, 107 may also include MMUs 122, 124, 126, and caches 106, 134, 136. The memory expander microchips 102, 105, 107 may also include cache data directories 103, 104, 127, 128, data compression tables 123, 125, 129, and CODECs 108, 130, 132. The memory channels 110, 112, 114 may include memory buffers 116, 118, 120.

Each memory expander microchip 54, 102, 105, 107 may include scalability logic (multi-node coherency support and a scalability interface). Such logic may be included within the MMUs 101, 122, 124, 126. The memory expander microchips 54, 102, 105, 107 may include multi-node coherency support and three scalability ports to support point-to-point interconnect of up to four nodes.

The local memory expander node 140 (including memory expander microchip 54, channels 102 and non-volatile memory 48) may include one to four processors 12 attached to the memory expander microchip 54. The three remote memory expander nodes 142, 144, 146 may be interconnected through memory expander/scalability microchips. The remote memory expander nodes 142, 144, 146 may be processor-less, or not directly attached to a processor. Each remote memory expander node 142, 144, 146 may have additional non-volatile memory attached to the eight memory channels coming off each of the memory expander/scalability microchips on the three remote memory expander nodes 142, 144, 146.

Compression cache accesses may need to have low latency. As such, the compression cache 100 may be positioned on the local node. The eight memory channels 102 may support an eight-way associative compression cache. This feature may provide improved compression cache performance. All compressed data and the compressed data directory may be held in memory on the three remote nodes.

The compressed data directory may not require as much main store space as the compressed data. The compressed data directory may be held on a single node, across all three remote nodes on one (or more) memory channels, or any combination thereof. In a preferred embodiment, the compressed data directory is held on a single remote node. As with all other components shown in FIG. 3, the compressed data directory could also be held on a memory channel 102 on the local node with all remote nodes holding compressed data, or within the compressed data, itself.

The additional memory capacity provided by the three remote nodes may result in an increased capacity for compressed data. In turn, the increased capacity may result in higher system performance compared to storing data on disk. Compressed data may not be accessed as frequently, and may tolerate the higher off-node latency.

Figure 4:
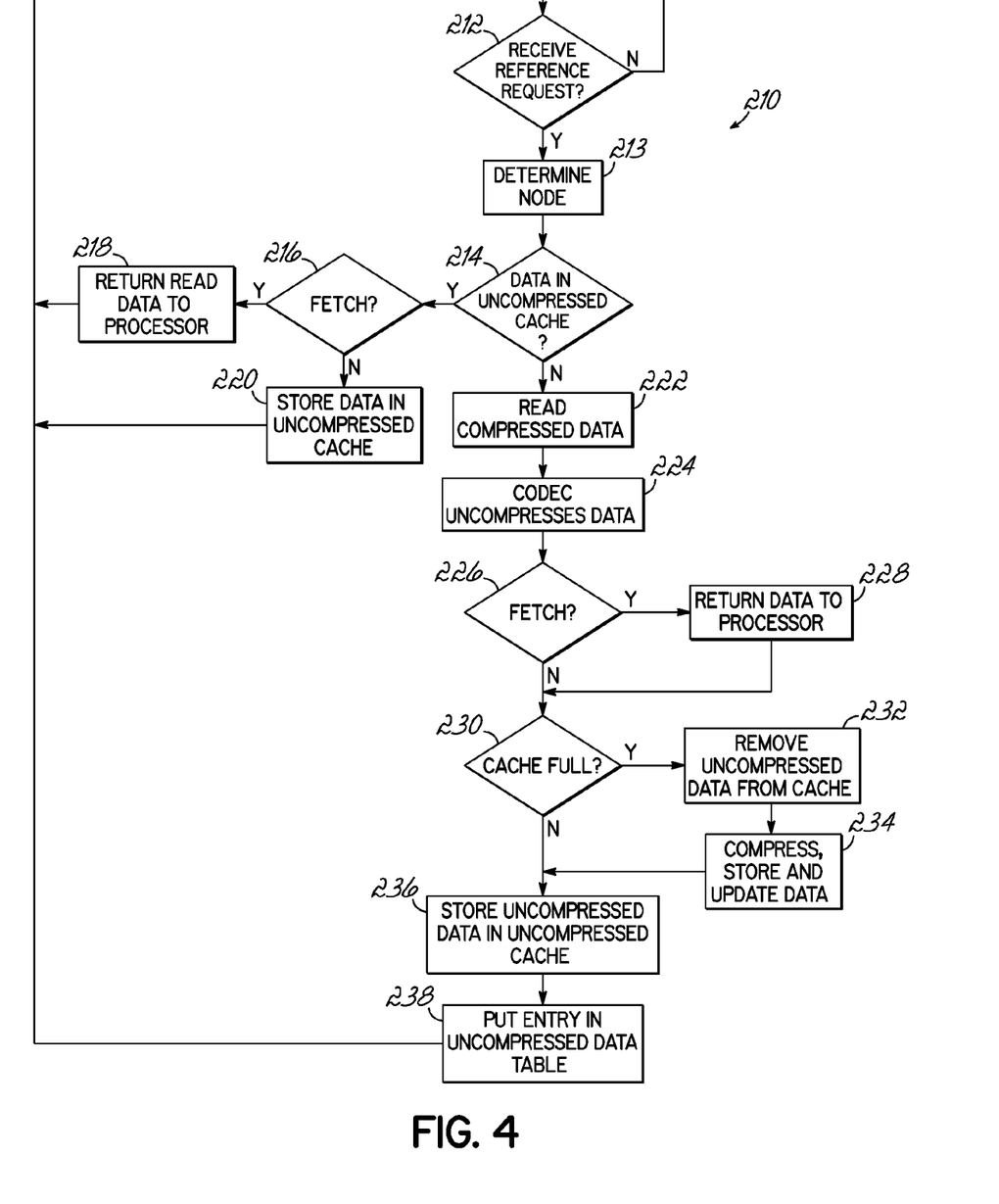
FIG. 4 is a flowchart showing examples of read and write operations in an embodiment using a memory architecture consistent with aspects of the present invention.

FIG. 4 is a flowchart 210 showing examples of read and write operations in an embodiment using a memory architecture consistent with aspects of the present invention. The system 90 receives at block 212 a memory reference request and may determine at block 213 which node should be accessed to handle the request. For instance, the system 90 may access a local node to determine at block 214 if the data is in the data cache directory 103, 104, 127, 128. If the data is in the data cache directory 103, 104, 127, 128, the system 90 then may check at block 216 whether the command was a fetch or store. If it was a fetch, the system 90 may then retrieve at block 218 the data and transmit it to the physical processor 12 or other requesting unit. If the command was a store at block 220, the data may be stored in the data cache 106, 134, 136.

If the data is otherwise in the compressed storage in the non-volatile memory 48, the system 30 may initiate a read of the compressed data at block 222. The CODEC 108, 130, 132 may uncompress the data at block 224.

The system 90 may determine at block 226 if the request is a fetch. If so, then the data may be returned to the processor 12 at block 228.

If the request is alternatively to store data, then the system 90 may determine at block 230 if the data cache 106 is full. If the data cache 106 is full, then the system 90 may initiate at block 234 a cast out operation. That is, the system 90 may remove at block 232 the least recently used data element in the data cache 106, 134, 136 to the compressed storage in the non-volatile memory 48. Accordingly, the data may be sent to the CODEC 108 for compressing at block 234. The system 90 may additionally store the compressed data in the compressed memory/non-volatile memory 48, and update the data element in the compressed data table 98.

Where the uncompressed data cache is not full at block 230, the system 90 may store at block 236 the uncompressed data in the data cache 106 (along with any store updates). The system 90 may place an entry in the compressed data table 98, as appropriate. Where the data cache 106 is held in storage with the uncompressed data on main memory, a read may result in a retrieval of the data along with bits indicative of an address of cache. Where different components are not collocated, multiple reads may be needed.

In one embodiment, the system 90 may determine and appropriately store data according to its frequency of use. Namely, most frequently used data may be stored in non-volatile memory 48 of the local node. Less frequently used data may be stored in compressed storage in the non-volatile memory 48 of remote nodes. The system 90 may continually shift stored data by adding new data and transferring old data into the compressed storage in the non-volatile memory 48 of an appropriate node, which may occur as a background process. This is an example of a most recently used algorithm for writing data to memory. The flowchart 210 shown in FIG. 4 is only one example of read and write operations using the memory architecture of the present invention, other such operations are possible.

While the present invention has been illustrated by a description of various embodiments and while these embodiments have been described in considerable detail, it is not the intention of the Applicant to restrict, or in any way limit the scope of the appended claims to such detail. For instance, while memory compression logic is discussed herein as being present on a memory expander, other embodiments may insert memory compression logic on a buffer located on the memory channels that are positioned between the processor and the circuit boards that hold memory microchips, e.g., the non-volatile memory.

The invention in its broader aspects is therefore not limited to the specific details, representative apparatus and method, and illustrative example shown and described. For example, the memory attached to the memory expander may in some applications store an uncompressed data cache and/or uncompressed data for further processing advantages. Accordingly, departures may be made from such details without departing from the spirit or scope of Applicant's general inventive concept.

What is claimed is:

1. An apparatus, comprising:
   a memory;
   a processor directly attached to the memory; and
   a plurality of memory expander nodes, wherein at least one of the memory expander nodes is in communication with the processor, and each memory expander node comprises:
      a non-volatile memory;
      a memory expander microchip configured to access the non-volatile memory; and
      a memory channel connecting the memory expander microchip and the non-volatile memory.

2. The apparatus of claim 1, wherein the memory expander microchip is configured to implement operations involving memory compression.

3. The apparatus of claim 1, wherein the memory expander microchip is configured to implement operations involving multi-way associativity.

4. The apparatus of claim 1, wherein the memory expander microchip of the at least one memory expander node in communication with the processor includes a cache associated with uncompressed data.

5. The apparatus of claim 1, wherein at least one memory expander node of the plurality is configured to communicate with another memory expander node, and not with the processor.

6. The apparatus of claim 1, wherein the memory includes dynamic random access memory storing uncompressed data.

7. The apparatus of claim 1, wherein the memory expander microchip includes a cache.

8. The apparatus of claim 1, wherein the non-volatile memory includes compressed data.

9. The apparatus of claim 1, wherein the non-volatile memory includes at least one of phase change memory and flash memory.

10. The apparatus of claim 1, wherein the memory expander microchip includes at least one of compressed and uncompressed data.

11. The apparatus of claim 1, wherein the memory expander microchip is configured to implement memory read and write commands initiated by the processor.

12. A method of managing compressed memory data, comprising:
   attaching a first memory directly to a processor;
   attaching a memory expander node to the processor;
   attaching another memory expander node to at least one of the processor and the memory expander node, wherein each memory expander node comprises:
      a non-volatile memory;
      a memory expander microchip configured to access the non-volatile memory; and
      a memory channel connecting the memory expander microchip and the non-volatile memory; and
   implementing a memory access operation by executing program code at the memory expander microchip.

13. The method of claim 12, wherein implementing the memory access operation further comprises implementing a memory compression operation.

14. The method of claim 12, wherein implementing the memory access operation further comprises storing compressed data within the non-volatile memory.

15. The method of claim 12, wherein implementing the memory access operation further comprises implementing the operation on a cache comprising part of at least one of the non-volatile memory and the memory expander microchip.

16. The method of claim 12 further comprising storing uncompressed data in dynamic access memory of the first memory.

17. The method of claim 12 further comprising storing at least one of compressed and uncompressed data in the node memory.

18. The method of claim 12 further comprising initiating at the processor the implementation of the memory compression operation on the data.

19. The method of claim 12 further comprising dynamically altering an amount of at least one of uncompressed and compressed data in the other memory expansion node.

20. A program product, comprising:
   program code to be executed by a memory expander microchip to implement a memory operation on a memory expander node that includes the memory expander microchip and a non-volatile memory, wherein the program code is further executed to communicate with both a processor having directly attached memory and another memory expander node; and
   a non-transitory computer readable medium bearing the program code.

* * * * *